United States Patent [19]
Dunning et al.

[11] Patent Number: 5,741,090
[45] Date of Patent: Apr. 21, 1998

[54] INJECTOR FOR POLYMER PLACEMENT AND METHOD THEREFORE

[76] Inventors: Levant G. Dunning; Ardith Arlene Dunning, both of 8621 Coolwoods Way, Sacramento, Calif. 95828; K. C. Doyle Forbes, P.O. Box 601071, South Lake Tahoe, Calif. 96153

[21] Appl. No.: 399,838

[22] Filed: Mar. 6, 1995

[51] Int. Cl.$^6$ .................................................. A01C 23/00
[52] U.S. Cl. .................. 405/263; 405/269; 405/270; 239/69; 239/159; 239/170; 239/304; 239/310; 239/10; 239/754; 239/195; 111/127; 111/7.1; 222/461; 222/529; 222/536
[58] Field of Search .................. 239/69, 159, 170, 239/304, 307, 310, 10, 195, 754, 9; 405/269, 270, 263, 264, 52; 111/127, 7.1, 118; 222/529, 536, 461; 166/275; 366/34

[56] References Cited

U.S. PATENT DOCUMENTS

| | | |
|---|---|---|
| 1,723,955 | 8/1929 | Shepherd et al. . |
| 2,930,334 | 3/1960 | Marron et al. . |
| 3,012,526 | 12/1961 | Baldwin et al. . |
| 3,474,746 | 10/1969 | Hiniker . |
| 3,521,819 | 7/1970 | Johnston . |
| 3,815,525 | 6/1974 | Kainson et al. . |
| 3,875,876 | 4/1975 | Pustovoit et al. . |
| 3,902,558 | 9/1975 | Watson, Jr. . |
| 4,009,666 | 3/1977 | Russell et al. . |
| 4,033,745 | 7/1977 | Moore . |
| 4,145,207 | 3/1979 | Moore . |
| 4,163,657 | 8/1979 | Koslow et al. . |
| 4,164,413 | 8/1979 | Jinno et al. . |
| 4,298,512 | 11/1981 | Sartoretto et al. . |
| 4,300,461 | 11/1981 | Hodge et al. . |
| 4,332,610 | 6/1982 | Sartoretto et al. . |
| 4,380,886 | 4/1983 | Koslow et al. . |
| 4,409,015 | 10/1983 | Grace, Jr. . |
| 4,448,690 | 5/1984 | Maphis . |
| 4,526,606 | 7/1985 | Formaini . |
| 4,578,105 | 3/1986 | Moore . |
| 4,697,960 | 10/1987 | Pelto et al. ............... 405/269 X |
| 4,763,836 | 8/1988 | Lyle et al. ............... 239/69 |
| 4,807,544 | 2/1989 | Cross et al. . |
| 4,838,701 | 6/1989 | Smith et al. . |
| 4,895,303 | 1/1990 | Freyvogel ............... 239/307 X |
| 4,907,516 | 3/1990 | Rogers ............... 111/127 |
| 4,917,304 | 4/1990 | Mazzei et al. ............... 239/304 X |
| 4,927,447 | 5/1990 | Youssef et al. . |
| 5,013,349 | 5/1991 | Tanaka . |
| 5,141,366 | 8/1992 | Ishida et al. ............... 405/269 X |
| 5,271,694 | 12/1993 | Cooper ............... 405/263 X |
| 5,394,812 | 3/1995 | Dunning et al. ............... 111/127 |
| 5,544,810 | 8/1996 | Horvath, Jr. et al. ............... 239/304 X |

Primary Examiner—Terry Lee Melius
Assistant Examiner—Christopher J. Novosad
Attorney, Agent, or Firm—Bernhard Kreten

[57] ABSTRACT

A system and method for injecting liquid/solid mixtures into porous pulse media, such as earth, is disclosed. A two-tank arrangement where liquid only is stored and run through a main pump, while a liquid/solid slurry is stored and moved to join the liquid under pressure by a chemical injector pump is shown. Finally, a displacement wheel commands solenoid valves, for pulsing the pressured liquid, through a distance measuring device such as a laser interacting with a laser target operatively coupled to a ground traveling wheel.

134 Claims, 8 Drawing Sheets

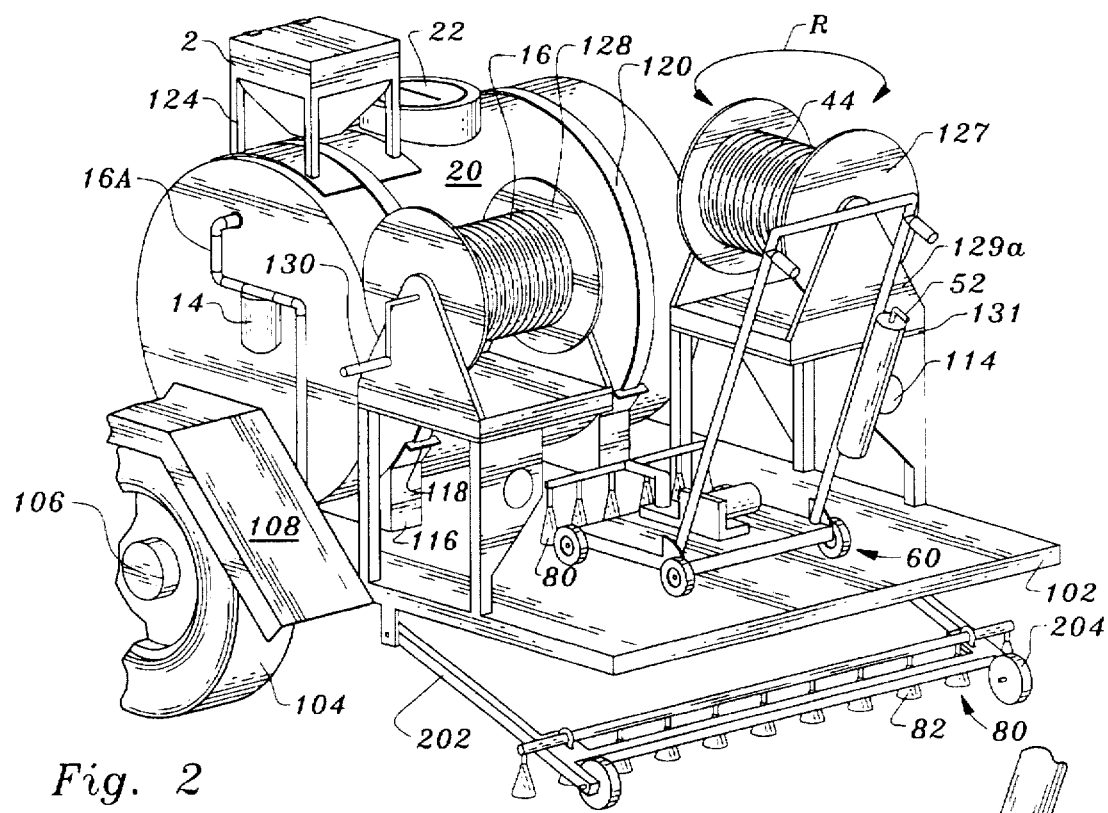
Fig. 2
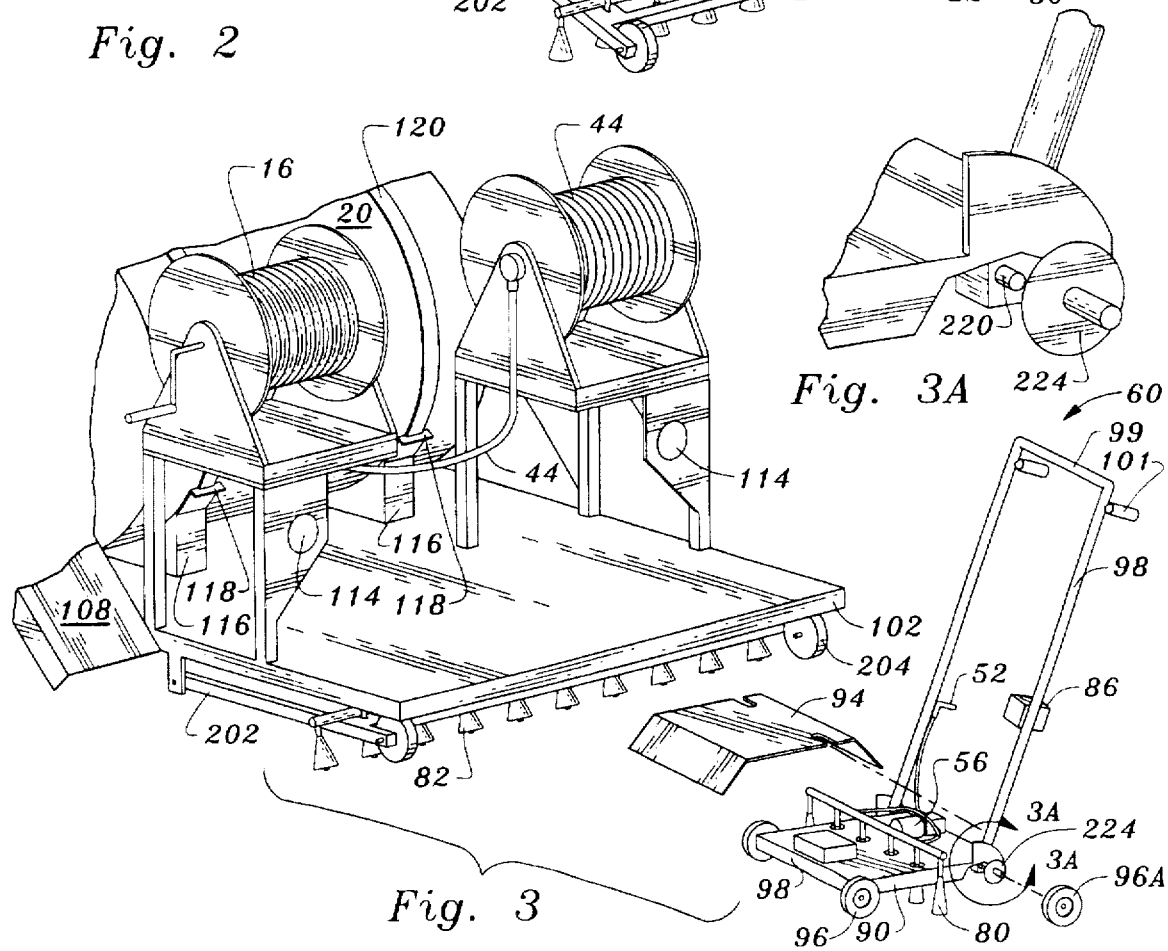
Fig. 3
Fig. 3A

INJECTOR FOR POLYMER PLACEMENT AND METHOD THEREFORE

FIELD OF THE INVENTION

The following invention relates generally to a further improved method and apparatus for high-pressure liquid injection of substances into soil. More particularly, the invention relates to an apparatus for delivering a hydrophylic polymer mixture (or other agricultural substances) and a method for injecting these substances into the soil to be treated such that the need for subsequent irrigation (or other agricultural maintenance) is decreased and plant growth is optimized. Further improvement in the invention was had when the polymer of the liquid/solid mixture was stored separately from the liquid and a means was provided for mixing the solid material with the liquid such that the resulting mixture did not pass through from the main liquid pump. Other additional improvements were had when a flush line for a chemical injector pump which moved material from a second storage means to the intermixing point was provided. Finally, a variety of arrangements for disposing the outlets for final handling of the liquid/solid mixture was found for all alternative methods of application.

An apparatus and method is disclosed for injecting a small quantum of gel-like substances of hydrophylic material into the ground as discrete cylindrical hydrophylic slugs deployed in a uniform pattern. Upon penetration of the soil, and especially when the slug of material reaches a soil change or gradient, the hydrophylic material stops its advancement into the soil substrata and either fans out or remains in its initial configuration. Water which contacts the hydrophylic material, as when irrigation is subsequently administered, causes the hydrophylic material to swell and hold the water for protracted periods of time.

BACKGROUND OF THE INVENTION

The disclosure of a patent application, co-pending U.S. patent application Ser. No. 07/871,353, now U.S. Pat. No. 5,394,812, described an injector for polymer placement and method therefore. The disclosure of U.S. patent application Ser. No. 07/871,353, now U.S. Pat. No. 5,394,812, is specifically incorporated herein by reference.

A need for improving the above-disclosed system existed when it came to facilitating the movement of solid material to the point of intermixing with liquid. Previously, the solid material had been intermixed with the liquid in the one reservoir/storage means. This meant that when the liquid with the solid material was run through the pump, the solid material scoured the lines leading to and from the main pressure pump, as well as the pump parts. Additionally, it was difficult to flush the lines and machinery parts that handled the liquid/solid mixture. To perform such a flushing operation, the liquid solid reservoir storage means would have to be emptied of the liquid solid mixture. Then a flush liquid, such as water, would be put into the storage means and run through the machinery and lines.

One known technique for dispensing the polymer involves mixing the polymer with water in an injection pump which directly receives the polymer. Water is then pumped therein at high pressure. Please see FIG. 13. Mixing polymer in this manner stresses the equipment because the polymer may clump up when mixed in this fashion, especially when dispensing is to be throttled on and off.

A need also existed for improving the above-disclosed system as far as location of the outlets to inject the liquid/solid mixture. Another problem that can interact with this problem is location of the storage means for the solid material can, for some arrangements, be faraway from the outlets that inject the liquid/solid material into the porous media. If the storage means for solid material is very close to the outlet, the force of gravity can aid in transporting the solid material to the point of intermixing with the liquid. Additionally, locating the point of intermixing the liquid and the solid close to the outlet minimizes the travel distance for this mixture. When the travel distance is minimized, piping and other machinery exposed to the scouring action of the liquid/solid mixture is minimized.

To provide a desired distribution pattern for the injections of quanta of liquid/solid mixture, a controller actuates valves which provide short bursts of liquid/solid mixture directed into the ground. In order for the controller to fire the valve means in a pattern that will bring the desired distribution pattern, the distance the device travels over porous media should be input into the controller. Not only was a measurement device for distance traveled needed, but a variety of devices depending upon the field conditions wherein the device is operated was needed. Finally, a variety of devices embodying the controller function were needed, again to satisfy the different requirements of different environments in which the device would be operating. Specifically, if the device should be operated in a geographical region where sophisticated technical repair service is not available, the controller and valve means should utilize less sophisticated technology.

Finally, to meet the need to mix a variety of solids into a liquid/solid mixture and thereafter inject into porous media, a need existed for a device that could hold separate the solid from the liquid while the device is idling, or not being used. Specifically, some solids would not remain in a workable liquid/solid mixture if intermixed with liquid in a significant amount of time before injection. This may be due to the solid material coagulating into an unmanageable solid mass if stand time was too long after intermixing. Additionally, some solid material or some liquid/solid mixtures may present a hazard if not properly controlled. In other words, the act of mixing the two phases may present a danger whereas separate means for storage of phases not intermixed may be much less hazardous.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 1,723,955 | August 6, 1929 | Shepherd, et al. |
| 2,930,334 | March 29, 1960 | Marron, et al. |
| 3,012,526 | December 12, 1961 | Baldwin, et al. |
| 3,474,746 | October 28, 1969 | Hiniker |
| 3,521,819 | July 28, 1970 | Johnston |
| 3,815,525 | June 11, 1974 | Kainson, et al. |
| 3,875,876 | April 8, 1975 | Pustovoit, et al. |
| 3,902,558 | September 2, 1975 | Watson, Jr. |
| 4,009,666 | March 1, 1977 | Russell, et al. |
| 4,033,745 | July 5, 1977 | Moore |
| 4,145,207 | March 20, 1979 | Moore |
| 4,163,657 | August 7, 1979 | Koslow, et al. |
| 4,164,413 | August 14, 1979 | Jinno, et al. |
| 4,298,512 | November 3, 1981 | Sartoretto, et al. |

-continued

| PATENT NO. | ISSUE DATE | INVENTOR |
| --- | --- | --- |
| 4,300,461 | November 17, 1981 | Hodge, et al. |
| 4,332,610 | June 1, 1982 | Sartoretto, et al. |
| 4,380,886 | April 26, 1983 | Koslow, et al. |
| 4,409,015 | October 11, 1983 | Grace, Jr. |
| 4,448,690 | May 15, 1984 | Maphis |
| 4,526,606 | July 2, 1985 | Fonnaini |
| 4,578,105 | March 25, 1986 | Moore |
| 4,763,836 | August 16, 1988 | Lyle, et al. |
| 4,807,544 | February 28, 1989 | Cross, et al. |
| 4,838,701 | June 13, 1989 | Smith, et al. |
| 4,907,516 | March 13, 1990 | Rogers |
| 4,927,447 | May 22, 1990 | Youssef, et al. |
| 5,013,349 | May 7, 1991 | Tanaka |

The patent to Shepherd, et al. teaches the use of an interior Venturi form of nozzle 37 to enable steam to spray dry substances, stored in container 23 and propelled to elbow 35 adjacent nozzle 37 by turbine 25, into trees. The instant invention is distinguishable because no source of steam is needed to operate the device.

SUMMARY OF THE INVENTION

The instant invention facilitates the introduction of a liquid/solid mixture into porous media, such as earth. Previously, the final liquid/solid mixture was created before the liquid was put under injection pressure. The instant invention provides a device and method for achieving the final proportions of the liquid/solid mixture to be injected at a point nearer the outlets. By doing so, considerable wear from the scouring actions of the solid material on machinery parts and lines, especially wear on the high pressure pump parts, can be avoided.

The instant invention also provides a means for establishing a desired distribution pattern for injection of quanta of the liquid/solid mixture over the area of porous media. Preferably, a distance measuring device, such as a displacement wheel that engages the surface of the porous media when the apparatus travels over that surface, provides input to a computer controller that determines the timing and firing order of valves that supply the pressurized liquid/solid mixture to the outlets. The exact nature of the distance measuring device chosen from a collection of such devices that include laser devices, Hall effect devices, strain gauge means and mechanical linkages (such as a distributor shaft) will depend upon the particular use environment for the apparatus.

The solid to be injected can also be any agricultural chemical such as a pesticide or fertilizer. The solid can also be a substance used in soil remediation. The solid can be a polymer, such as cross-linked polyacrylamide copolymer, that promotes water conservation by absorbing water after irrigation and then dispensing it to plant roots at a slow rate, thus eliminating the loss of water that drains out of the soil, especially sandy soil. One particular location where the present invention can be used is on golf courses, especially those courses in an arid environment.

OBJECTS OF THE INVENTION

Accordingly, it is a primary object of the present invention to provide a new and improved polymer injecting apparatus and method therefore.

A further object of the present invention is to provide a device as characterized above which is relatively inexpensive to manufacture, benefits from mass production techniques, and is durable and safe to use.

A further object of the present invention is to provide a device as characterized above constructed such that the structure is easily transported to and utilized in a variety of horticultural environments.

A further object of the present invention is to provide a device as characterized above which is capable of having the outlet disposed on a separately guided wheeled frame, thus allowing the operator access to spaces otherwise unavailable to larger vehicles.

A further object of the present invention is to provide a device as characterized above which is capable of injecting soil around orchards, trees and shrubs.

A further object of the present invention is to provide a device as characterized above which has a reduced need for maintenance due to less wear on pump and line machinery parts because the solid material of a liquid/solid mixture to be injected is intermixed as close to the outlet part as possible.

A further object of the present invention is to provide a device as characterized above which allows easy flushing of solid material from machinery parts downstream of the solid material storage reservoir.

A further object of the present invention is to provide a device as characterized above which may intermix and apply in an liquid/solid mixture any number of solid materials.

A further object of the present invention is to provide a device as characterized above which allows use of solid materials which cannot remain intermixed with liquid for significant periods of time during which the liquid/solid mixture becomes unworkable.

A further object of the present invention is to provide a device as characterized above which has a controller which, in response to the distance the device travels over a porous media such as earth, causes an injection pattern of desired configuration.

From one vantage point, the object of the present invention is an apparatus for injecting polymer into the upper surface of the Earth to facilitate water retention by the polymer holding water, comprising in combination: a land vehicle, a container having fluid inside on the land vehicle, a bin having polymer therein and located on the land vehicle, at least one injector means, a conduit communicating between the fluid container and the injector means, a passageway communicating between the bin and the injector means, and means to fire said injector; whereby polymer and fluid are first mixed at the injector and propelled into the upper surface.

Viewed from a second vantage point, it is an object of the present invention to provide a device for injecting discrete quanta of a mixture of liquid and solid material into porous media comprising in combination: a first storage means within which the liquid resides, a second storage means within which the solid material resides, at least one outlet for distributing the liquid and solid mixture, a means for delivering the liquid from the storage means under pressure, a communication means to accept liquid under pressure from said delivery means and guide the migration of said liquid to the outlet, a valve means interposed between the communication means and the outlet to interrupt migration of liquid from the delivery means to the outlet, an entraining means for taking the material from the second storage means and intermixing the solid material with the liquid.

Viewed from a third vantage point, it is an object of the present invention to provide a method of injecting discrete quanta of a mixture of liquid and solid material into porous media, the steps including: storing liquid in a first storage means, storing solid material in a second storage means, delivering the liquid from the first storage means to at least one outlet, throttling the liquid adjacent the outlet to pulse the liquid, and entraining the solid material into the liquid by delivering the solid material from the second storage means to the liquid.

Viewed from a fourth vantage point, it is an object of the present invention to provide a device for injecting discrete quanta of a mixture of liquid and solid material into porous media comprising, in combination: a first storage means within which the liquid resides, a second storage means within which the solid material resides, at least one outlet for distributing the liquid and solid mixture, means for delivering said liquid from said storage means under pressure, a communication means to accept liquid under pressure from the delivery means and guide the migration of the liquid to the outlet, a valve means interposed between the communication means and the outlet to interrupt migration of the liquid from the delivery means to the outlet, an entraining means for taking the solid material from the second storage means and intermixing the solid material with the liquid, and, a control means for the valve means that opens valve means allowing the quanta of the liquid to pass to outlet, the control means establishing a quanta flow pattern responsive to distance said device has traveled over said porous media.

These and other objects will be made manifest when considering the following detailed specification when taken in conjunction with the appended drawing figures.

BRIEF DESCRIPTION OF THE DRAWINGS

FIG. 2 is a perspective view of both portions of the device with one portion placed on the other portion according to another embodiment of the present invention.

FIG. 3 is a perspective view of both portions of the device with one portion apart from the other portion, and the smaller portion being partially exploded to show detail according to the same embodiment of the present invention.

FIG. 3A is a cut away round the wheel mount of the small portion of the device shown in FIG. 3.

DESCRIPTION OF PREFERRED EMBODIMENTS

Figure 1:
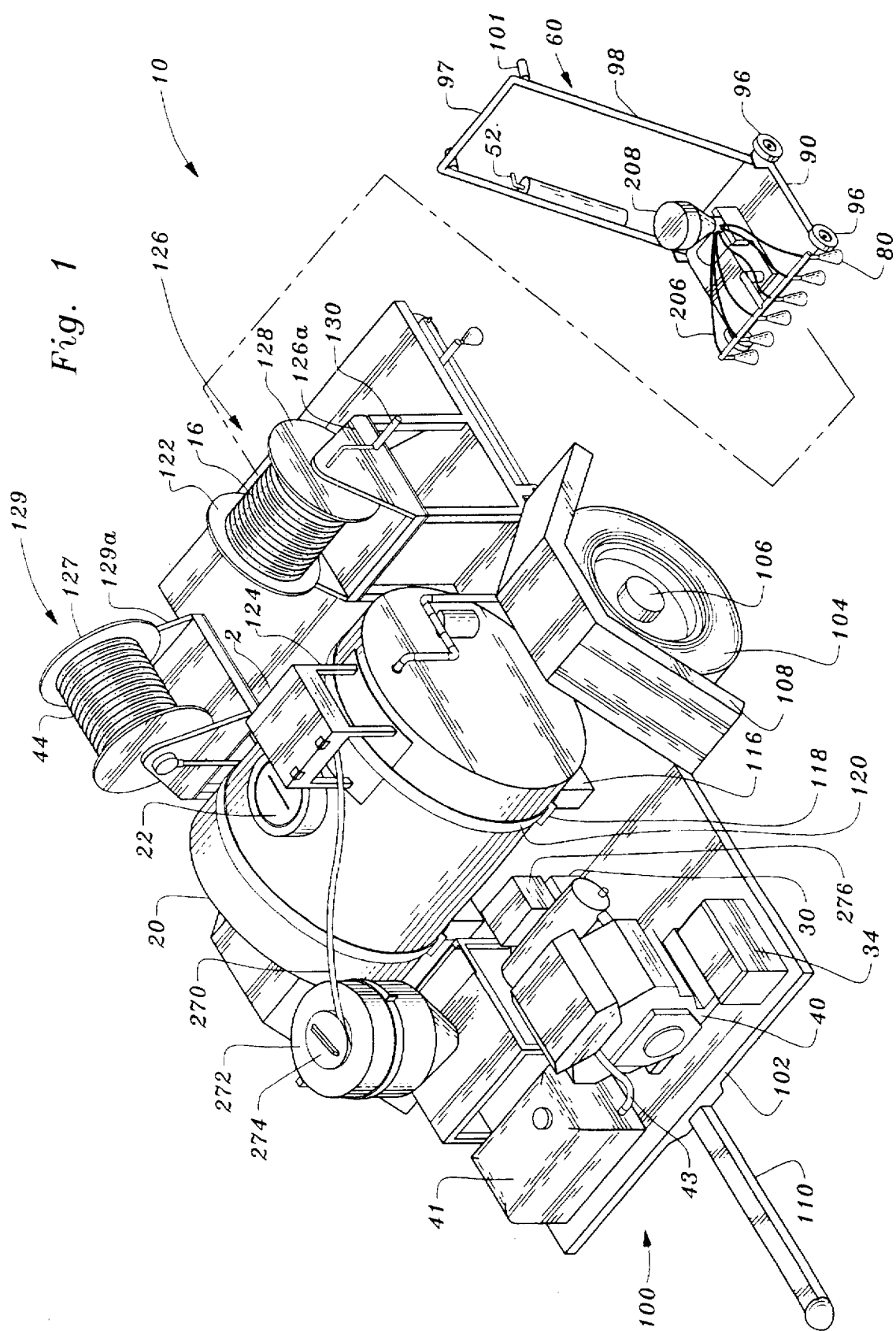
FIG. 1 is a perspective view of the two portions of the device according to one embodiment of the present invention.

Considering the drawings, wherein like reference numerals denote like parts throughout the various drawing figures, reference numeral 10 (FIG. 1) is directed to the injector device according to the present invention.

In its most elemental form, the injector device 10 includes two components: a trailer 100 upon which a storage tank 20 is provided within which the liquid to be injected is stored, and an outlet 60 which actually dispenses the liquid at the desired site. A high pressure hose 44 allows fluid to be communicated from the tank 20 to the outlet 60, as will be explained, with various instrumentalities interposed between the tank 20 and the outlet 60 for the purposes of efficiently allowing the system to operate in an optimal manner.

Referring specifically to FIGS. 1 through 3, the details with respect to the trailer 100 and the associated tank 20 can now be explored. The trailer 100 includes a platform 102 elevated above the ground by means of a pair of wheels 104 interconnected by means of an axle 106 so that the trailer 100 can move from one location to another. Fenders 108 over the wheels 104 protect an upper portion of the trailer from contamination kicked up by the wheels 104. A leading portion of the trailer 100 includes a tongue 110 and also may include a trailer hitch to facilitate towing. Appropriate taillights 114 are provided on a rear portion of the trailer remote from the tongue 110.

A top surface of the trailer 100 supports the tank 20 by means of support pillows 116 which attach to a bottom of the tank by means of straps 120 and saddle members 118. In essence, the pillows 116 are fixed to a top surface of the platform 102 while the straps 120 are removably attachable to the saddle 118. The saddle 118 is fixed to the pillow. In this manner, the straps 120 can removably secure the tank as should now be evident.

Figure 5:
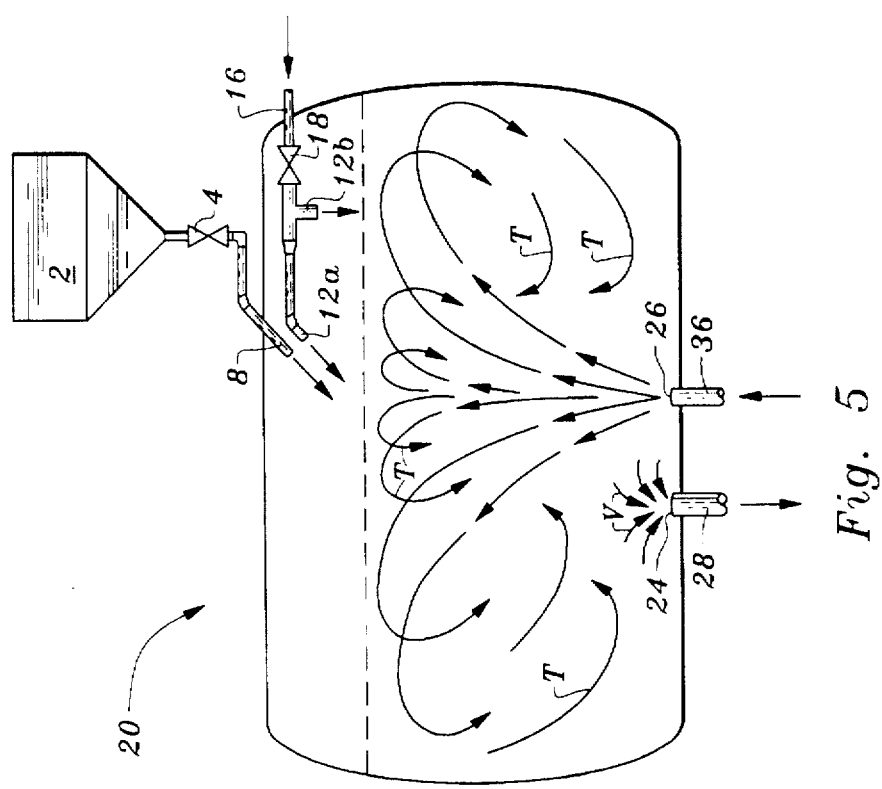
FIG. 5 is a sectional schematic view of a mixing tank transverse to a longitudinal axis showing turbulence present.
Figure 13:
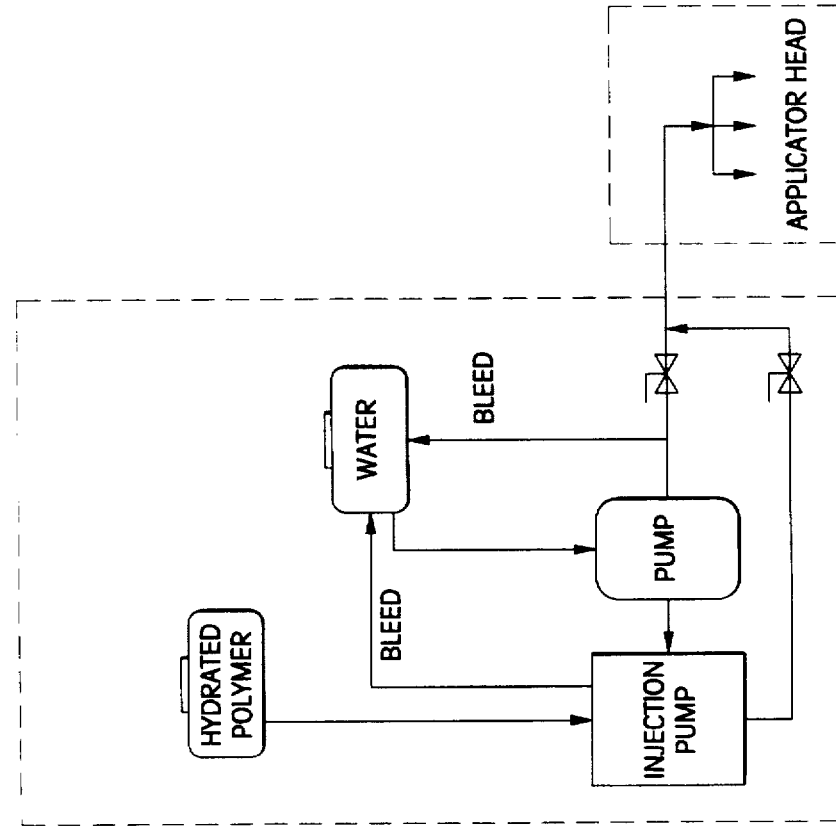
FIG. 13 is an existing device in schematic form.

The tank 20 includes an access lid 22 located on a topmost portion of the tank 20 which is formed by a boss extending up from the tank. The boss is fashioned for mating engagement with the access lid 22. Thus, the interior of the tank 20 can be accessed through lid 22. FIG. 5 reflects the provision of a drain 24 at a bottom of the tank 20 and a return 26 for liquid to the bottom of the tank in a manner to be defined.

An upper portion of the tank also includes a hopper 2 communicating with an interior of the tank 20 and providing a feed by which pulverulent or other solid materials can be judiciously admixed into the tank 20. More particularly, the hopper 2 is supported atop the tank 20 by means of a pad 122 (FIG. 1) perched on an exterior of the tank 20 and overlying the strap 120. In one form of the invention, the pad 122 could be integrally formed with strap 120 and removable therewith. In any event, a plurality of legs 124 extend up from the pad 122 and support the hopper 2 in elevation so that the material can flow by means of gravity to within the tank. The hopper 2 is provided with a lid to prevent contamination of the material to be mixed. It is contemplated that the polymer or other solid materials can be loaded from this hopper into the tank 20.

In another embodiment of this invention, the outlet from hopper 2 goes into a granular feeder which is powered by the twelve volt battery 39. This granular feeder (hidden in FIG. 1) can feed the solid material either into tank 20 or through supply hose 270 into hydrated polymer tank 272. The hose 270 can be put into partially opened tank lid 274. Although the hydrated polymer tank 272 is called by that name, of course it is to be realized that any type of solid material can be hydrated or otherwise intermixed with any other type of liquid from tank 20. The hydrated solid mixture, often in a form of a slurry, is then transported through a flow meter 278 (shown later in FIG. 4) and is finally propelled by a valve controlled chemical injector pump 276. After leaving the chemical injector pump 276, the slurry is pumped to a point where it joins the high pressure liquid, this junction point can be before or after high pressure hose 44 depending upon the arrangement of dispensers 80.

Figure 4:
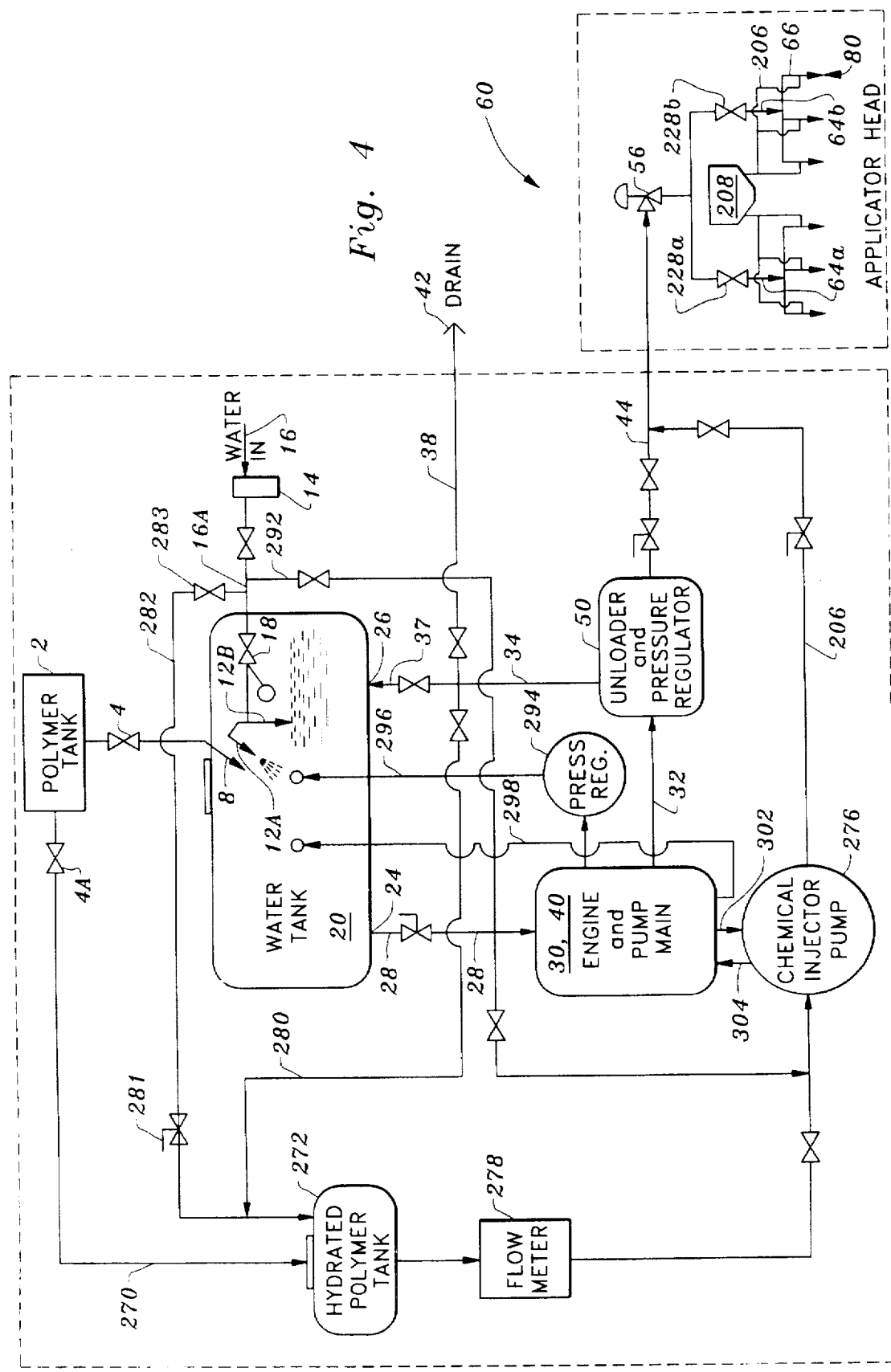
FIG. 4 is a schematic view of the device with a flush line installed in and solid material storage reservoir disposed upon a remotely guided separate wheeled frame.

FIGS. 1, 4 and 5 reflect the existence of valves 4 and 4a which regulate the feed of material from the hopper 2 into the interior of the tank 20 or in hydrated polymer tank 272. In one form of the invention, the valve 4 is controlled by an electric current produced through a conductor which receives a signal for the need of more polymer from a float valve 18 within the tank and to be described shortly. The material from the hopper 2 is sprayed into a central topmost portion of the tank by means of a nozzle 8.

While the nozzle 8 is dispensing polymer, it does so in response to a signal sent from a float valve 18 which monitors the level of liquid within the tank. Typically, it is preferred that the liquid remain below the nozzle 8 but near the top of tank 20. When the level should fall to an undesirably low state, the float portion of float valve 18 will drop to a lower position, enabling a switch which sends an electrical signal requiring the addition of further polymer. In addition, and at the same time, actuation of the float valve (creating a demand for more polymer) also opens a valve to allow more water to be admitted into the tank 20.

The tank 20 distributes water in two branches. A first branch 12a has a nozzle outlet substantially parallel to and at a lower horizontal elevation from the polymer nozzle 8. Thus, as the polymer exits the nozzle 8 as a fine spray it first contacts a mist of water exiting the first branch 12a of a waterline. A second branch 12b of the waterline dispenses water directly into the tank 20.

Water is received beyond the float valve 18 from a waterline 16a having a filter 14 interposed in line therewith to preclude the unwanted passage of contaminants which may damage downstream equipment. The waterline 16a is in operative communication with hose 16 on a reel 126 (FIG. 1) supported on a top surface of the platform 102. The reel 126 has a pair of upwardly extending tangs 126a which supports a spool 128 having hose 16 thereon. In this manner, the trailer can be removed from a fixed waterline by a substantial distance, at least the length of the hose 16 contained on the reel 126. A hand crank 130 is operatively coupled to the reel 126 and spool 128 to allow the hose 16 to be retracted once it has been played out. Thus, a storage tank 20 is provided which receives filtered water from a remote area. The water and the polymer are mixed and held in the tank 20 for subsequent use.

The polymer to be mixed with the water can be a substance that when mixed in soil or other growing media can extend the time between watering or flood irrigation. One such polymer is a cross-lined polyacrylamide copolymer (sold under the trademark TERRA-SORB) available from Industrial Services International, Inc. of Bradenton, Fla.

Continuing to refer to FIG. 4, a flush line 292 is provided by the closing off of the check valves leading to the hydrated polymer tank and the water tank. Flush line 292 also has in it plural check valves to close it off when it is not in use. Flush line 292 runs to a junction with conduit 28 wherein yet another valve down line of the junction can direct flush liquid into the engine and pump 30. From here the engine and pump 30 would push the flush liquid through the unloader 50 and valve controlled, high-pressure line 44 out to the outlet 60. The flush liquid can also be run through pump pressure regulator 294 and return to the water tank 20. However, if the valve is open in the flush line 292 the flush liquid can continue on its way to chemical injector pump 276. After the flush liquid has run through the chemical injector pump 276, it can continue flowing through a valve controlled passageway or entraining means 206 to high pressure line 44 where it then can go to outlet 60. The flush liquid often is water, the same liquid as used to hydrate the polymer and the same liquid as stored in tank 20 for later pumping at high pressure. The same liquid as is put into first storage means 20, can also be run through third feed line 282 branching off waterline 16a to hydrate the polymer or other solid material in hydrated polymer tank 272. Third feed line 282 is secured at extremities thereof by valves 281,283.

Hydrostatic pressure of the liquid mixture in the tank 20 causes the liquid to be dispensed by gravity from the drain 24 and through a conduit 28 coupled to the drain which in turn communicates with a pump 30. The pump takes the relatively low-pressure, gravity-feed liquid coming through conduit 28 and discharges it at a relatively high pressure, typically in excess of 3000 psi, through pump outlet conduit 32.

Preferrably, the pump 30 (FIG. 1 and 4) can be energized by its operative coupling to an engine 40 through a direct drive gear driven system. Alternatively, a pulley system could be used. One pulley is disposed on the pump, and another on the engine. The pulleys are connected by means of the drive belt. The engine 40 is preferably gas powered and is initially energized by means of a battery 39 carried on a top surface of the platform 102. Fuel is fed to the engine 40 from a gas tank 41 similarly carried on a top surface of the platform 102. A gas line 43 extends between the gas tank 41 and the gas engine 40 providing gasoline.

The pump outlet conduit 32 is in operative communication with a bypass means 50 (seen in FIGS. 4 and 10) which functions as both an unloader and pressure regulator. In essence, the bypass means 50 throttles fluid between one of two passageways; a return conduit 34 ultimately providing diversion of the liquid back to the tank 20 and a high pressure conduit 44 which goes to the outlet means 60 to be described. The bypass means 50 includes a pressure gauge denoting an internal pressure within the bypass to provide an indicator on the trailer of the status of the system in operation. The return conduit 34 is operatively coupled to a valve controlled T-branch which diverts the liquid into one of two directions; either to a drain 42 via conduit 38 or to a return line 37 which feeds the liquid back into the tank 20 through the return opening 26 formed in the bottom of the tank 20.

Note that FIG. 5 reflects a circulation pattern caused by having the return line 37 and return outlet 26 receiving liquid from the pressure regulator bypass means 50. As shown in FIG. 5, extreme turbulence as suggested by the arrows T assure that little sedimentation if any occurs or that separation of the polymer from the water is negligible so that the substance stays mixed and agitated substantially during the entire time that the device 10 is in operation. By having the return 26 and the associated low pressure line 37 oriented offset from the geometrical center of the tank bottom but along a center line with respect to the longitudinal axis of the tank 20, a bias is created resulting in greater turbulence to the right-hand side of FIG. 10 than the left-hand side. Notice however that the drain 24 and the drain conduit 28 are somewhat larger than the return 37. This provides a vortex V at the drain 24 to provide a swirl adjacent the drain for improved circulation in mixing on that (left-hand) side of the tank 20. The drain 24 is offset from a geometrical center of the tank substantially to the same extent as the return 26 and in the same vertical plane.

Returning to FIG. 4, it should be noted that water can return to the water tank 20 through two additional means. Pump 30 has two additional ports that allow the pump to control its internal pressure. The first port allows the pump to control its high pressure load. When it is desirable to relieve some of the 3,000 pound pressure, the pressure regulator 294 can allow liquid to travel through second return line 296 and exit at an elevated position within tank 20, sometimes above the water level. Pump 30 also has a port that feeds a liquid from a lower pressure region, typically about 1,000 psi, to third return line 298. As with second return line 296, the exit from return line 298 can be within water tank 20 and may be above the water level inside the tank. The region of lower pressure within pump 30 can be used to drive chemical injector pump 276. Fluid, typically under 1,000 psi, travels through drive line 302 into chemical injector pump 276 to provide motive power. The fluid then returns via fourth return line 304 to the lower pressure area of pump 30.

Liquid may also leave the bypass means 50 either via a high pressure line 44 (FIG. 10) or can be drained through a conduit 46 beyond a valve 48 which is tapped into the high pressure line 44 at a site immediately proximate the pressure regulator and its associated pressure gauge on the trailer. As shown in FIG. 1, the high pressure hose 44 can be stored on a reel 129 (similar to hose 16). Reel 129 has upwardly extending tangs 129a which support a spool 127 upon which the high pressure line 44 can be stored and retracted possibly by means of a hand crank 131 operatively connected to the spool 127. In this manner, the outlet 60 can be removed from the trailer 100 a considerable distance by playing out high pressure line 44 to the outlet 60 in a manner to be defined. Typically, the internal pressure of this high pressure line is in the order of (3,000) psi. Tangs 129a can be mounted on a swivel platform 131 which allow reel 129 to pivot back and forth as indicated by arrow R. By allowing reel 129 to so pivot, hose 44 can be played out over a much greater area and the area injected with liquid/solid mixture from one parked position of the trailer 100 is consequently greater.

Attention is now directed to FIGS. 2 through 4. Details with respect to one form of outlet 60 are reflected therein. The high pressure liquid in line 44 is operatively coupled to the outlet 60 by means of a coupling 52 carried on a carriage which includes a wheeled frame 90. The frame also supports the dispensers 80 for distributing the liquid pumped from the tank 20. In essence, the coupling 52 communicates liquid in line 44 to a solenoid valve 56.

The solenoid valve 56 has an open duration and closed duration which is adjustable by virtue of its operative coupling to a time-delay relay or, which can be coupled to a computer controller (86). The relay has two variables which control the solenoid valve: the duration of time when the solenoid valve 56 remains open which allows liquid to pass therebeyond and the duration of time when the solenoid valve 56 remains closed which diverts the liquid from the outlet 60 and redirects the liquid back into the tank 20 by means of the bypass 50 as explained hereinabove. In a similar manner, the computer controller can control the solenoid valve 56.

An important feature of this apparatus involves the ability to control the solenoid in both phases of its operation, i.e. the length of time that valve 56 remains closed and the length of time that valve 56 remains open. For example, the length of time that the solenoid valve remains closed (thereby bypassing the outlet) may be modified as a function of the speed at which the wheeled frame 90 moves along the surface that is to be treated. Typically, the duration for which the solenoid remains open thereby dispensing a quantum of fluid therebeyond may relate to the magnitude of the liquid dispensed during each injection pulse. Thus, fine tuning in the distribution pattern can be obtained for different types of ground porosity. A slow travel speed by the wheeled frame over the terrain coupled with a short burst of fluid beyond the solenoid valve into the ground has the effect of providing a multiplicity of small "charges" densely distributed over the terrain. At the other extreme, a large quantum can be distributed in a sparse pattern if so desired. Obviously permutations of these two extremes are also readily evident in view of the foregoing.

The timing of the burst for injecting the liquid/solid mixture can also be determined by a device attached to the wheel 96 on structure 60. As shown in FIG. 3A, this device can be a laser device 220. Laser device 220 can be aimed at laser target 224 which is operatively coupled to wheel 96. Disposed on laser device 224 in the area where the laser beam from laser device 220 will impinge, can be indicia which indicate which solenoid valve and outlet should be fired. In this way, a pattern of distribution of injections of quanta of liquid/solid mixture can be established by the rotation of laser target 224. Of course other modifications of the distance measuring device can be had wherever the firing controller is located on the apparatus. Other devices such as Hall effect devices, strain gauge means, and such mechanical devices as cam and follower can be used to established this distribution of firing for the outlets. Additionally, the distance measuring device can be mechanically engaged such as through gear means with a mechanical device that fires the valves. In particular, the displacement wheel 204 can be operatively connected to a central shaft of a distributor. As shown in FIG. 3, the distance measuring device, especially if it is the laser device 220, can communicate with computer controller 86 mounted on the frame 98 of outlet device 60. This computer controller 86 can then fire the valves in an even more complex pattern than would be possible from mere response to the passage of indicia on laser target 224 in front of laser device 220.

As shown in FIG. 4, the two branches 64a and 64b each communicate with a manifold 66 and boom at a forward portion of the wheeled frame 90. Preferably interposed between the solenoid valve 56 and the dispensers 80 in each branch 64a and 64b are ball valves 228a and 228b respectively. These ball valves 228a and 228b are closed alternatively during the flushing operation. By doing so, only half the outlet dispensers 80 are subject to flushing at one time and thus the lower pressure of the flush liquid (typically 40–60 psi, ie. water main pressure) is not sufficiently divided to render the flushing operation inoperative due to inadequate flush liquid pressure. Because the pressure of the liquid/solid mixture is higher during the injection operation (typically 3,000 psi), all outlets (80) can receive the pressurized liquid/solid mixture and still not encounter insufficient pressure problem.

Figure 6:
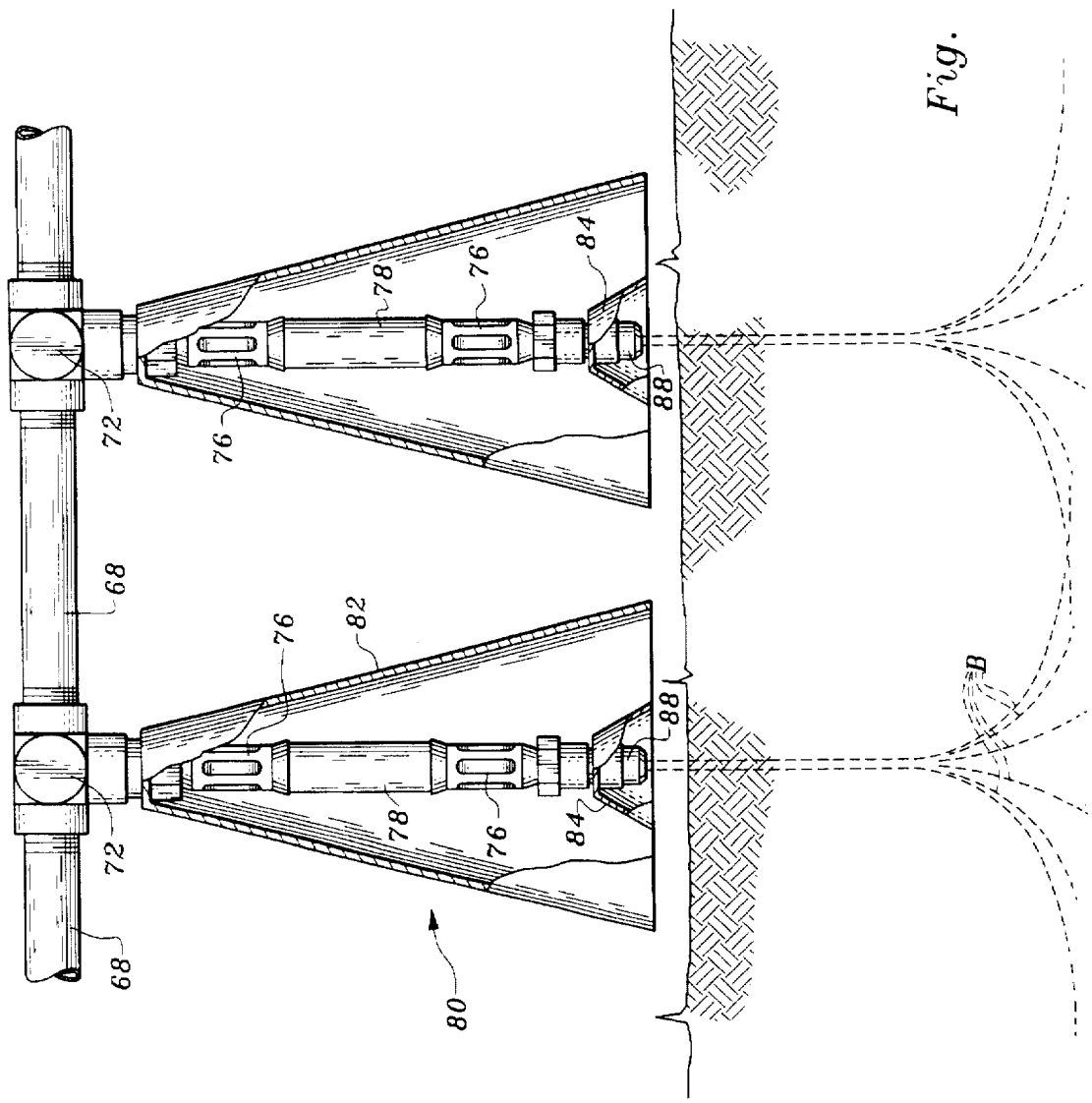
FIG. 6 is partially fragmented view of the outlets of the present invention.

FIG. 6 reflects structural details of the dispenser 80 as it may appear and explains the manner in which liquid from the dispenser 80 contacts the earth over which frame 90 passes. As shown, each dispenser 80 includes an upper section 76 preferably formed from rigid material and a similar lower section 77 spaced from the upper rigid section by means of an intermediate flexible portion 78. A lowermost extremity of the rigid section 77 away from the tee 72 terminates in a deflector cup 84. Cup 84 opens downwardly and diverging towards the ground. Cup 84 is a truncated cone having a hollow interior. Note that liquid escaping from a nozzle 88 at a lowermost terminus of lower section 77 departs from the dispenser 80 in a substantially needle-like stream. That is, the nozzle 88 allows the fluid to be dispensed therefrom as a very thin elongate cylindrical stream of liquid.

In certain instances, the boom and the wheeled carriage frame 90 may pass over uneven terrain or contact obstacles such as rocks or other forms of debris. When this occurs, these obstructions may cause deflection of either the dispenser 80 or the stream. The intermediate flexible section 78 is intended to counteract the tendency of the nozzles 88 to become damaged or pass trauma to the connections on the boom when nozzles 88 receive shock loads from having encountered an immovable obstacle. By having the intermediate flexible section 78 yield in the face of an unyielding object, the reliability of the outlet 60 will have been extended. When high pressure streams are emitted from the nozzle 88, it may be desirable to circumscribe the dispenser 80 with another downwardly extending cup which is fixed from the lowermost portion of the tee 72 as it connects with the rigid section 76. Thus, another downwardly open facing, outwardly diverging cone 82, somewhat similar in configuration to the deflector cup 84 extends from the tee 72. Cone 82 provides another control over the unwanted dissemination of liquid therebeyond. This cone 82 is isolated from the flexible section 77, and it can be made from resilient material characterized in its ability to have a sufficient memory to return to an original, unstressed state after contact with an immovable object.

A degree of protection against errant liquid leaving the dispenser or outlet 80 and migrating in an unwanted manner may be afforded by blanket 94 which can be a rigid plastic cover extending over a topmost portion of the wheeled frame 90.

The wheel and frame assembly 90 may be most easily understood perhaps from viewing FIG. 3. It includes a front pair of wheels 96 and a rear pair of wheels 96a carried on a rectangular frame 98. Frame 98 includes a hand grip area 99 whose angle of attack is adjustable. A hand grasping area 101 is also provided.

In sum, cup 84 can accommodate some reflected liquid from dispenser 88. Cone 82 does not bend with flexible section 78 and can protect from additional splatter. Cone 82 may be flexible. Blanket or splash guard cover 94 can protect from similar unwanted liquid migration. One, two, or all three devices may be used at once.

Referring back to FIG. 6, with the device as thus far described, an intense needle of liquid contacts and penetrates the earth substantially unaffected by its initial contact with the soil, depending of course upon the consistency of the soil over which this device 10 is being passed. In extremely sandy soil, penetration of the liquid can be approximately as much as eight inches under (3,000) psi pressure before the liquid slows down sufficiently that it tends to splatter, i.e. fan out as shown by the direction of the diverging migratory pattern reflected by reference arrows B of FIG. 6. Where the soil has an extremely dense quality such as a high clay composition, the fanning out phenomena may occur only two inches below the soil surface. By taking representative soil core samples, the delivery pressure of the liquid can be moderated by operative manipulation of a valve on the bypass 50 within certain limits to control the depth at which the device will deliver material. In addition, the length of the boom will directly affect pressure at which the liquid is dispensed.

Figure 7:
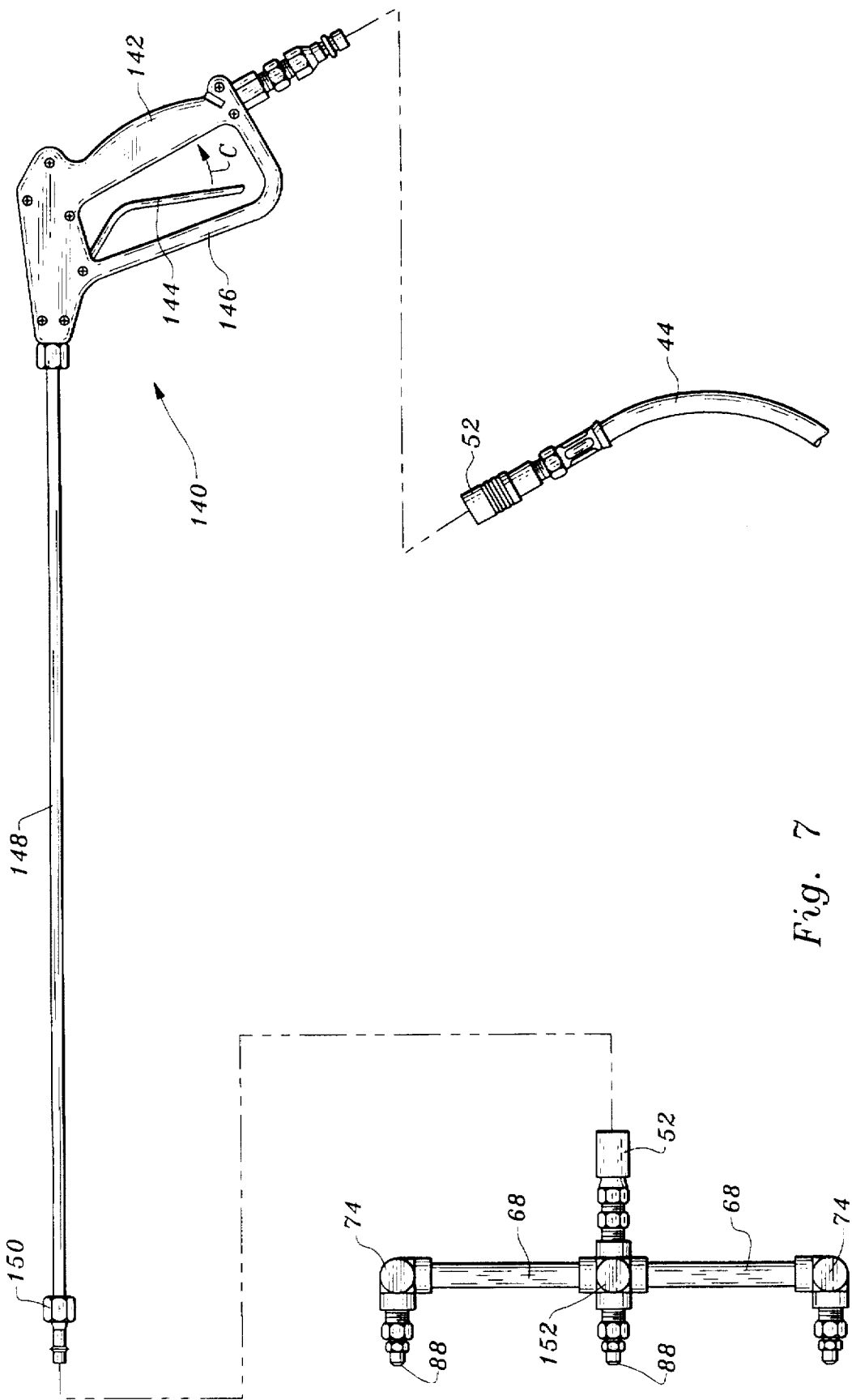
FIG. 7 is a side view of an alternative embodiment of an injector arrangement.

In some instances, the wheeled frame 90 does not provide sufficient compactness to enter extremely cramped corridors. In other situations, a multiplicity of dispensers 80 are not required. FIG. 7 reflects such a scenario. As shown in FIG. 7, a hand manipulated wand 140 is in operative communication with the high pressure line 44 by means of a coupling 52 described hereinabove. The wand 140 includes a hand grip area 142, a trigger 144 and a trigger guard 146. Operation of the trigger in the direction of the arrow "C" opens a valve (not shown) allowing liquid within the high pressure conduit 44 to pass beyond the valve to a rigid wand 148. A terminal portion 150 of the rigid wand dispenses the liquid therefrom. Examples of where the wand 140 is desirable would be around trees or shrubs. In some instances, however, the outlet 150 can couple to a manifold via another quick disconnect coupling 151 and hence downwardly to a fourway passage 152 which communicates at lateral extremities with a rigid rod 68 extending horizontally therefrom and a downwardly extending dispenser 88. The rigid section 68 communicates with elbows 74 and then to other dispensers 88 as shown in FIG. 7.

Figure 8:
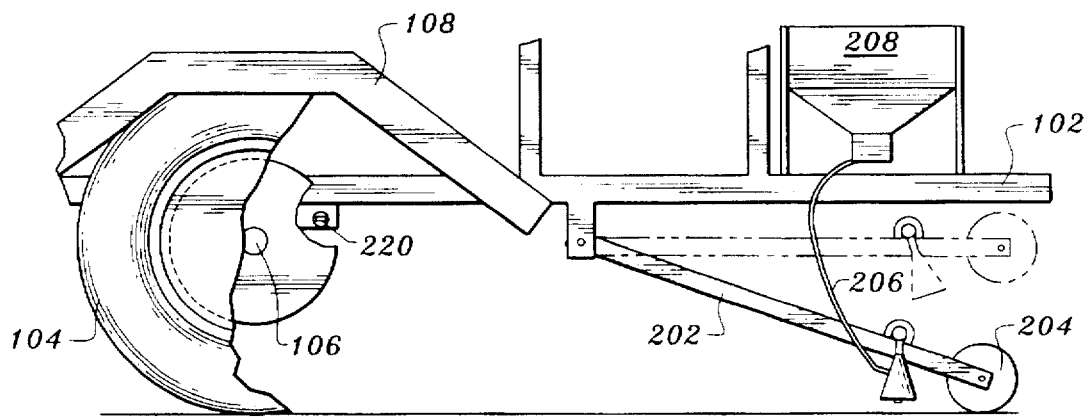
FIG. 8 is a side view of portion of the device with the let-down bar shown in the lowered position, and the let-down bar in the raised position shown in phantom.
Figure 9:
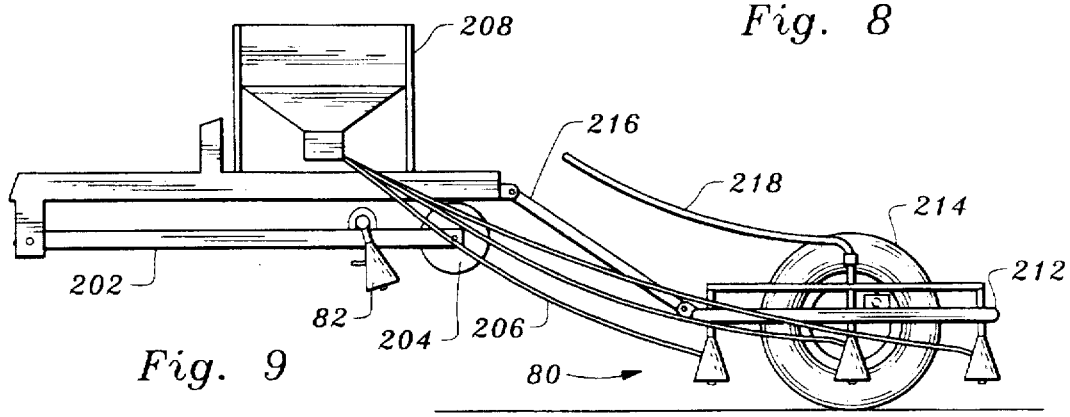
FIG. 9 is a side view of a portion of the device wherein a trailing bogie has a manifold and outlets disposed thereon, which are connected to the solid material storage reservoir.
Figure 10:
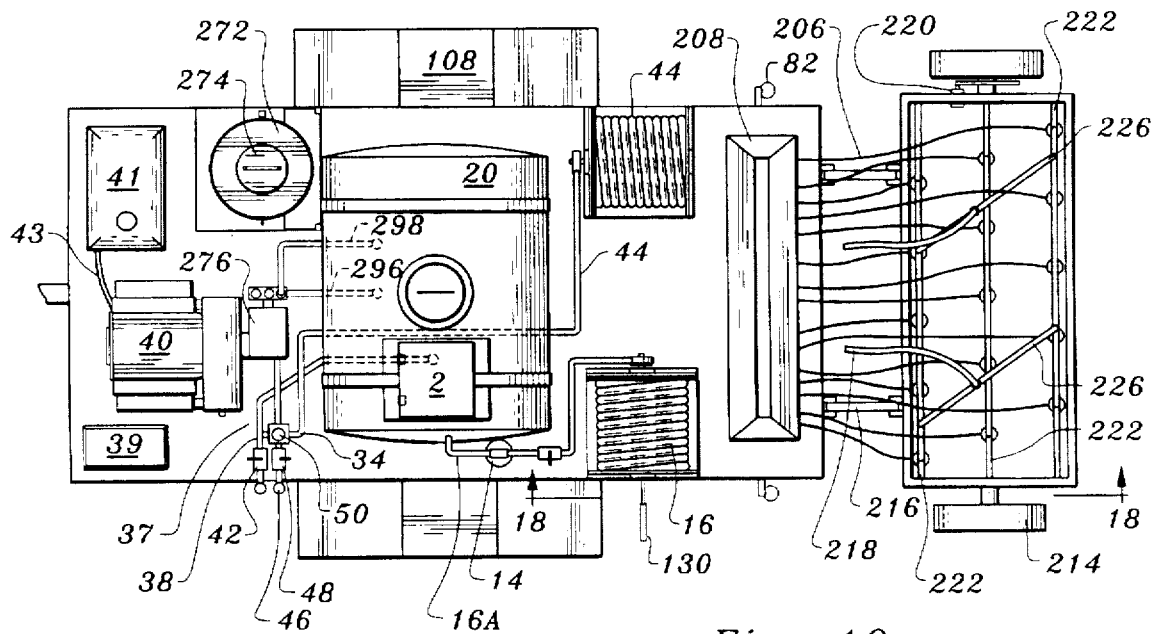
FIG. 10 is a top plane view of the device partially shown in FIG. 9.

Referring now to FIGS. 8 through 10 a let-down bar 202 is usually carried in the up position, as shown in phantom on FIG. 8, or in solid line on FIG. 9, when the trailer 100 is traveling from application location to application location. The let-down bar 202 has attached to it injectors or outlets 80 which are seen as having cones 82. Communicating from bin or second storage means 208 to outlet, also known as injector, 82 is passageway or entraining means 206. Entraining means or passageway 206 carries polymer from the bin or second storage means 208 by force of gravity assisted by the suction caused when high pressure liquid is directed through outlet 80 to move polymer or other solid material to the point where it is intermixed with the high pressure liquid. To signal the distance traveled by the device, displacement wheel 204 is placed at the end of let-down bar 202. The displacement wheel 204 can measure distance traveled by a variety of mechanisms such as a Hall effect device, laser device, or a strain gauge means. The displacement wheel 204 also can be mechanically coupled to a control means for determining firing order of the outlets 80. These mechanical linkages can be for instance a cam and follower means, where the follower means contact various locations to command the firing of particular outlets. The mechanical linkage can also be one wherein the displacement wheel 204 rotates a central shaft connecting to a distributor head. Additionally, as shown in FIG. 8, laser device 220 can interact with wheel 104, especially if the inside rim of wheel 104 has indica for each separate valve to be fired when the light beam from laser device 220 impinges on the indicia. The choice of one type of linkage, whether electronic or mechanical, will depend upon the environment in which the device is operating. A very dusty device may militate against using a light device. Additionally, a wet environment may militate against use of a Hall effect device.

Referring now to FIG. 9 an alternative embodiment of the present invention is displayed. Bogie 212 is shown as disposed on the ground being supported by bogie wheel 214. As shown in FIGS. 9 and 10, bogie wheel 214 is on each side of the trailer. Conduits 218 bring high pressure liquid to the bogie 212, where the high pressure liquid is guided to the three manifolds by outlets 80 disposed on three manifolds 222 which, in the illustrated embodiment, have five outlets per row. Connecting with the outlets 80 are passageways or entraining means 206 running back to bin or second storage means 208. Again, polymer or other solid material moves from bin 208 to outlet 80 by the force of gravity and also by the partial vacuum created when high pressure liquid from conduit 218 travels through outlet 80. Disposed on one of the bogie wheels is device 220 which can be a laser device used to measure distance traveled by bogie 212. Bogie 212 is attached to trailer 100 by bogie hitch 216.

Figure 11:
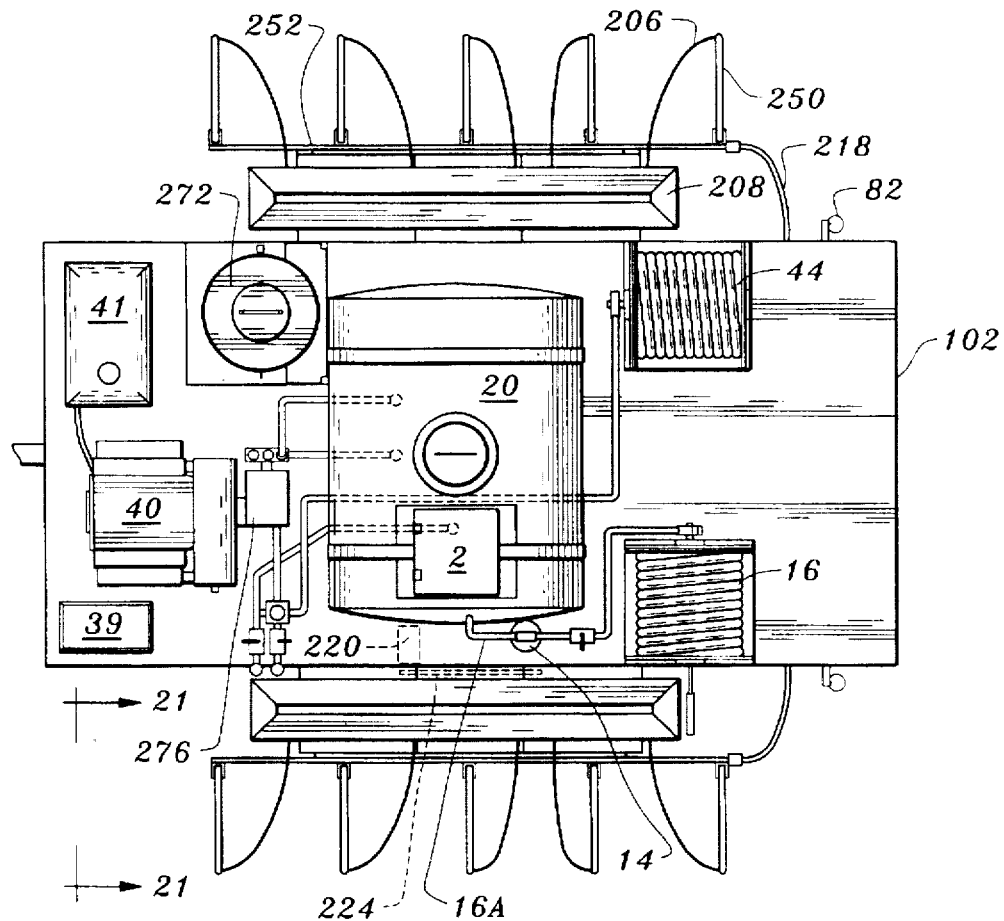
FIG. 11 is a top plane view of the apparatus with laterally extending booms with chisels and manifold fed by two separate solid material storage reservoirs.
Figure 12:
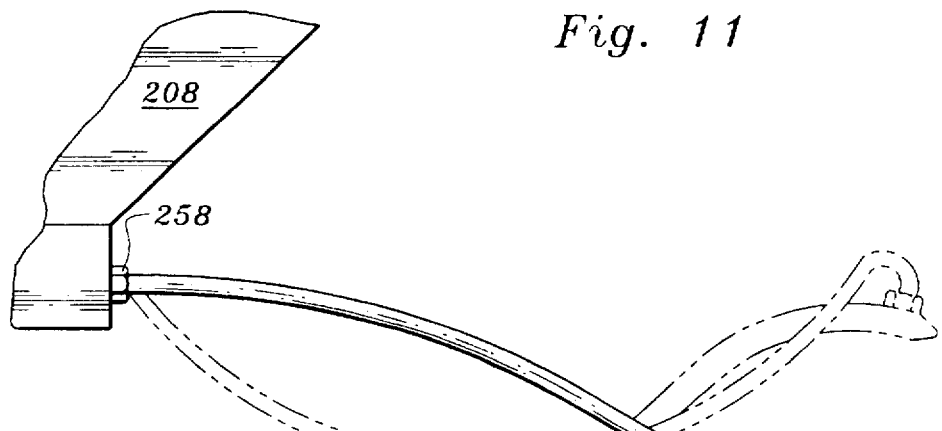
FIG. 12 is a side view of a portion of the device wherein a chisel with an attached outlet is shown in the let-down position, and the chisel in phantom is shown in a raised position.

Referring now to FIGS. 11 and 12, yet another alternative embodiment of the invention is shown. FIG. 11 is a top plan view of this embodiment of invention wherein two booms 252 extend laterally outward from trailer 100. Attached to boom 252 are multiple chisels 250. The multiple chisels 250 can be pivoted about manifold 66 which delivers the high pressure liquid to chisels 250. The chisels 250 may also be adjustable as to curvature at an articulation mechanism contained within the body of chisels 250. As shown in FIG. 12, the upraised position in phantom allows chisel 250 to travel in the forward direction of the vehicle without danger of contacting the ground. However, during application of liquid/solid mixture, chisel 250 is pivoted down. Chisel tip 254 then is in contact with the ground, such as earth that is elevated in a mound formation such as for row crops. Bin or second storage means 208 feeds solid material through passageway or entraining means 206 to chisel tip 254. The force for moving the solid material through passageway or entraining means 206 can be gravity assisted by the partial vacuum created when high pressure liquid pulsing from manifold 66 travels through chisel 250 and exiting through chisel tip 254 to be injected into the porous media. Passageway or entraining means 206 is flexible, thus allowing the pivoting of chisels 250 between an upraised and lowered application position. To provide for a tight fit between passageway or entraining means 206 and the bin or second storage means 208 and chisel tip 254, bin or second storage means coupling 258 and chisel tip coupling 256 are provided. These couplings 256 and 258 may be threadably engaged for quick disengagement should passageway or entraining means 206 become clogged and removal necessary in order to clear the line.

Moreover, having thus described the invention, it should be apparent that numerous structural modifications and adaptations may be resorted to without departing from the scope and fair meaning of the instant application as set forth hereinabove and as described hereinbelow by the claims.

We claim:

1. An apparatus for injecting polymer into an upper surface of the earth to facilitate water retention by the polymer holding water, comprising in combination:
   a land vehicle,
   a container having fluid inside on said land vehicle,
   a bin having polymer therein and located on said land vehicle,
   at least one injector means operatively connected to the land vehicle,
   a conduit communicating between the fluid container and said injector means,
   a passageway communicating between said bin and said injector means, and
   means to fire said at least one injector means;
   whereby polymer and fluid are first mixed by a chemical injector pump on said passageway at said at least one injector means and propelled into the upper surface.

2. The apparatus of claim 1 wherein said polymer is a cross-linked polyacrylamide co-polymer.

3. The apparatus of claim 1 wherein said means to fire said at least one injector means consists of at least one valve means.

4. The apparatus of claim 3 wherein said valve means includes at least one solenoid valve.

5. The apparatus of claim 4 wherein said at least one solenoid valve is activated in response to a signal from a controller.

6. The apparatus of claim 5 wherein said controller determines a valve actuation time in response to a distance said apparatus has travelled over the surface.

7. The apparatus of claim 6 wherein said controller is engaged with a displacement wheel on said apparatus, said displacement wheel rotates in response to traveling over the surface while said apparatus is in motion.

8. The apparatus of claim 7 in which said controller is a distributor whose central shaft is engaged through gear means with said displacement wheel.

9. The apparatus of claim 6 wherein said distance is measured with a laser means which interacts with an indicator on a displacement wheel which travels over said surface.

10. The apparatus of claim 6 wherein said distance traveled is measured by a Hall effect device on a displacement wheel which travels over said surface.

11. The apparatus of claim 6 wherein said distance is measured by a cam and follower means, whereby said cam and follower means moves in relation to a distance said apparatus has traveled over said surface.

12. The apparatus of claim 6 wherein said distance is measured by a strain gauge means.

13. The apparatus of claim 1 wherein said at least one injector means is disposed upon at least one manifold.

14. The apparatus of claim 13 wherein said at least one injector means is disposed on each of three manifolds.

15. The apparatus of claim 13 wherein said at least one manifold is disposed upon at least one let-down bar.

16. The apparatus of claim 15 wherein said at least one let-down bar further contains a displacement wheel which engages the surface, thereby signalling distance traveled to fire said injector means.

17. The apparatus of claim 13 wherein said at least one manifold is disposed upon at least one boom extending outward from said land vehicle.

18. The apparatus of claim 17 wherein said at least one boom extends laterally outward from said land vehicle.

19. The apparatus of claim 18 wherein said at least one boom extends laterally outward from each of two sides of said land vehicle.

20. The apparatus of claim 13 wherein said at least one manifold is disposed on a wheeled frame, said conduct is also disposed on said wheeled frame, and said and said passageway are sufficiently flexible in length to allow said wheeled frame to be directed separately from said land vehicle.

21. The apparatus of claim 20 wherein said bin is disposed upon said wheeled frame.

22. The apparatus of claim 13 wherein said at least one manifold is disposed on a hand-held wand.

23. The apparatus of claim 22 wherein said at least one manifold on said hand-held wand has three injector means.

24. The apparatus of claim 13 wherein said at least one manifold is remotely disposed from said land vehicle, wherein said at least one manifold includes a hose reel carried upon said land vehicle wherein said hose reel supports a hose acting as part of said conduit between said fluid container and said at least one injector means.

25. The apparatus of claim 1 wherein said at least one injector means is shielded by a flexible housing.

26. The apparatus of claim 25 wherein said flexible housing is covered by a blanket disposed in a horizontal orientation.

27. The apparatus of claim 26 wherein said flexible housing is surrounded by a curtain-shroud disposed in a vertical orientation.

28. The apparatus of claim 1 wherein said polymer is moved by the force of gravity from said bin to said at least one injector means.

29. The apparatus of claim 1 wherein said polymer is moved from said bin to said at least one injector means by said chemical injector pump disposed in said passageway.

30. The apparatus of claim 29 wherein a flush line accepts flush liquid and delivers said flush liquid to said chemical injector pump whereby said chemical injector pump, at least one injector means, and passageway downstream of said chemical injector pump can all be flushed with said flush liquid.

31. The apparatus of claim 1 wherein said polymer is premixed with said fluid and stored in a second bin before the resulting slurry is communicated to said at lest one injector means through said passageway.

32. The apparatus of claim 31 wherein said passageway further includes a check valve disposed downstream of said chemical injector pump.

33. The apparatus of claim 31 which further includes a flow meter disposed between said bin and said chemical injector pump.

34. The apparatus of claim 1 which further comprises a bypass means which with said communication conduit whereby liquid can be returned to said container when said means to fire said at least one injector means does not allow said liquid to pass through said at least one injector means.

35. The apparatus of claim 1 wherein said earth is disposed in a field for crops.

36. The apparatus of claim 1 wherein grass is growing on said earth.

37. The apparatus of claim 36 wherein said earth with grass growing on it is part of a golf course.

38. A device for injecting discrete quanta of a mixture of liquid and solid material into porous media comprising in combination: a mobile device,
- a first storage means within which the liquid resides on said mobile device,
- a second storage means within which the solid material resides on said mobile device,
- at least one outlet for distributing the liquid and solid material mixture,
- a means for delivering the liquid from said first storage means under pressure,
- a communication means to accept liquid under pressure from said means for delivering and to guide the migration of said liquid to said at least one outlet,
- a valve means interposed between said communication means and said at least one outlet to interrupt migration of liquid from said means for delivering to said at least one outlet,
- an entraining means for taking said material from said second storage means and intermixing said solid material with said liquid, wherein said entraining means includes a chemical injector pump, wherein said chemical injector pump injects said solid material into said liquid before said liquid has reaches said valve means.

39. The device of claim 38 wherein said solid material is an agricultural chemical.

40. The device of claim 38 wherein said solid material promotes water conservation.

41. The device of claim 40 wherein said solid material is a polymer.

42. The device of claim 41 wherein said polymer is a cross-linked polyacrylamide copolymer.

43. The device of claim 38 wherein said valve means includes at least one solenoid valve.

44. The device of claim 43 wherein said solenoid valve is activated in response to a signal from a controller.

45. The device of claim 44 wherein said controller determines a valve actuation time in response to a distance the device has traveled over the porous media.

46. The device of claim 45 wherein said controller is engaged with a displacement wheel on said device, said displacement wheel rotates in response to traveling over said porous media while said device is in motion.

47. The device of claim 46 in which said controller is a distributor whose central shaft is engaged through gear means with said displacement wheel.

48. The device of claim 45 wherein said distance is measured with a laser means which interacts with an indica on a displacement wheel which travels over said porous media.

49. The device of claim 45 wherein said distance traveled is measured by a Hall effect device on a displacement wheel which travels over said porous media.

50. The device of claim 45 wherein said distance is measured by a cam and follower means, whereby said cam and follower means moves in relation to said distance said device has traveled over said porous media.

51. The device of claim 45 wherein said distance is measured by a strain gage means.

52. The device of claim 38 wherein said at least one outlet is disposed upon at least one manifold.

53. The device of claim 52 wherein said at least one manifold is disposed on a wheeled frame, said valve means also disposed on said wheeled frame, and said communication means and entraining means being sufficiently flexible in length to allow said wheeled frame to be guided separately from said mobile device.

54. The device of claim 53 wherein said second storage means is disposed upon said wheeled frame.

55. The device of claim 52 wherein said at least one manifold is disposed on a hand-held wand.

56. The device of claim 55 wherein said at least manifold on said wand has three outlets.

57. The device 52 wherein said at least manifold is carried on said mobil device.

58. The device of claim 57 wherein said at least one outlet is disposed on each of three manifolds.

59. The device of claim 57 wherein said at least one manifold is disposed upon at least one let-down bar.

60. The device of claim 59 wherein said at least one let-down bar further contains a displacement wheel which engages the porous media, thereby signalling distance traveled to actuate said valve means.

61. The device of claim 57 wherein said at least one manifold is disposed upon at least one boom extending outward from said mobil device.

62. The device of claim 61 wherein said at least one boom extends laterally outward from said mobil device.

63. The device of claim 62 wherein said at least one boom extends laterally outward from each of two sides of said mobil device.

64. The device of claim 57 wherein said at least manifold is remotely disposed from said mobil device, wherein said at least manifold is connected to said delivery means by a hose reel carried upon said mobil device wherein said hose reel supports a hose for acting as a communication means between said first storage means and said at least outlet.

65. The device of claim 38 wherein said at least one outlet is shielded by a flexible housing.

66. The device of claim 65 wherein said flexible housing is covered by a splash guard cover disposed in a horizontal orientation.

67. The device of claim 66 wherein said flexible housing is surrounded by a curtain-shroud disposed in a vertical orientation.

68. The device of claim 38 wherein said solid material is moved by the force of gravity from said second storage means to said entraining means.

69. The device of claim 38 wherein said solid material is mixed with said liquid and stored in a third storage means before the resulting slurry is entrained by said chemical injector pump.

70. The device of claim 69 which further includes a flow meter disposed between said third storage means and said chemical injector pump.

71. The device of claim 38 wherein said entraining means further includes a check valve disposed downstream of said chemical injector pump.

72. The device of claim 38 wherein a flush line accepts a flush liquid and delivers said flush liquid to said chemical injector pump whereby said chemical injector pump, valve means, at least one outlet and entraining means can all be flushed with said flush liquid.

73. The device of claim 38 which further comprises a bypass means which communicates with said communication means whereby liquid can be returned to said first storage means when said valve means does not allow said liquid to pass to said at least one outlet.

74. The device of claim 38 wherein said porous media is earth.

75. The device of claim 74 wherein said earth is disposed in a field for crops.

76. The device of claim 74 wherein grass is growing on said earth.

77. The device of claim 76 wherein said earth with grass growing on it is part of a golf course.

78. A method of injecting discrete quanta of a mixture of liquid and solid material into porous media, the steps including:
 traveling over the porous media in a land vehicle,
 storing liquid in a first storage means on the land vehicle,
 storing solid material in a second storage means on the land vehicle,
 delivering under pressure said liquid from said first storage means to at least one outlet,
 throttling the liquid adjacent said at least one outlet to pulse the liquid,
 entraining said solid material into said liquid under pressure by delivering said solid material from said second storage means to said liquid, wherein said solid material is moved from said second storage means to an entraining point by a chemical injector pump, wherein said chemical injector pump injects said solid material into said liquid before the step of throttling the liquid adjacent the at least one outlet to pulse the liquid.

79. The method of claim 78 wherein said solid material is an agricultural chemical.

80. The method of claim 78 wherein said solid material promotes water conservation.

81. The method of claim 80 wherein said solid material is a polymer.

82. The method of claim 81 wherein said polymer is a cross-linked polyacrylamide copolymer.

83. The method of claim 78 wherein said throttling step is performed by at least one solenoid valve.

84. The method of claim 83 whereby a controller determines a valve actuation time in response to a distance the first storage means has travelled over the porous media.

85. The method of claim 84 wherein said controller is engaged with a displacement wheel attached to said first storage means, said displacement wheel rotates in response to movement over said porous media.

86. The method of claim 80 wherein said solid material is moved by the force of gravity from said second storage means to said entraining point.

87. The method of claim 80 wherein said method includes the further step of mixing said solid material with said liquid and storing in a third storage means before the resulting slurry is entrained by said chemical injector pump.

88. The method of claim 80 including a step whereby liquid can be returned to said first storage means when liquid flow is throttled off.

89. The method of claim 80 wherein said porous media is earth.

90. The method of claim 89 wherein said earth is disposed in a field for crops.

91. The method of claim 89 wherein grass is growing on said earth.

92. The method of claim 91 wherein said earth with grass growing on it is part of a golf course.

93. A device for injecting discrete quanta of a mixture of liquid and solid material into porous media comprising, in combination: a land vehicle for traveling over porous media:
 a first storage means within which the liquid resides,
 a second storage means within which the solid material resides,
 at least one outlet for distributing the liquid and solid material mixture,
 means for delivering said liquid from said first storage means under pressure,
 a communication means to accept liquid under pressure from said means for delivering and to guide the migration of said liquid to said outlet,
 a valve means interposed between said communication means and said at least one outlet to interrupt migration of the liquid from said means for delivering delivery means to said at least one outlet,
 an entraining means for taking said solid material from said second storage means and intermixing said solid material with said liquid, and
 a control means for said valve means that opens said valve means allowing said quanta of said liquid to pass to said at least one outlet, said control means establishing a quanta flow pattern responsive to distance said land vehicle has traveled over said porous media.

94. The device of claim 93 wherein said solid material is an agricultural chemical.

95. The device of claim 93 wherein solid material promotes water conservation.

96. The device of claim 95 wherein said solid material is a polymer.

97. The device of claim 96 wherein said solid material is a cross-linked polyacrylamide copolymer.

98. The device of claim 93 wherein said valve means includes at least one solenoid valve.

99. The device of claim 98 wherein said solenoid valve is activated in response to a signal from a controller.

100. The device of claim 99 wherein said controller determines a valve actuation time in response to a distance said device has travelled over the porous media.

101. The device of claim 100 wherein said controller is engaged with a displacement wheel on said device, said displacement wheel rotates in response to traveling over the porous media while said device is in motion.

102. The device of claim 101 wherein said displacement wheel is an integral part of a structure adapted to transport said first storage means.

103. The device of claim 101 in which said controller is a distributor whose central shaft is engaged through gear means to said displacement wheel.

104. The device of claim 100 wherein said distance is measured with a laser means which interacts with an indica on a displacement wheel which travels over said porous media.

105. The device of claim 100 wherein said distances traveled is measured by a Hall effect device, on a displacement wheel which travels over said porous media.

106. The device of claim 100 wherein said distance is measured by a cam and follower means, whereby said cam and follower means moves in relation said distance said device has traveled over said porous media.

107. The device of claim 100 wherein said distance is measured by a strain gauge means.

108. The device of claim 93 wherein said at least one outlet is disposed upon at least one manifold.

109. The device of claim 108 wherein said at least one manifold is disposed on a wheeled frame, said valve means also disposed on said wheeled frame, and said communication means and entraining means are sufficiently flexible in length to allow said wheeled frame to be guided separately from said land vehicle.

110. The device of claim 109 wherein said second storage means is disposed upon said wheeled frame.

111. The device of claim 108 wherein said at least one manifold is disposed on a hand-held wand.

112. The device of claim 111 wherein said at least one manifold on said wand has three outlets.

113. The device of claim 108 wherein said at least one manifold is carried on said land vehicle.

114. The device of claim 113 wherein said at least one outlet is disposed on each of three manifolds.

115. The device of claim 113 wherein said at least one manifold is disposed upon at least one let-down bar.

116. The device of claim 115 wherein said at least one let-down bar further contains a displacement wheel which engages the porous media, thereby signaling distance traveled to actuate said valve means.

117. The device of claim 113 wherein said at least one manifold is disposed upon at least one boom extending outward from said land vehicle.

118. The device of claim 117 wherein said at least one boom extends laterally outward from said land vehicle.

119. The device of claim 118 wherein said at least one boom extends laterally outward from each of two sides of said land vehicle.

120. The device of claim 113 wherein said at least one manifold is remotely disposed from said land vehicle, wherein said at least one manifold is connected to said means for delivering by a hose reel carried upon said land vehicle wherein said hose reel supports a hose for acting as a communication means between said first storage means and said at least one outlet.

121. The device of claim 93 wherein said at least one outlet is shielded by a flexible housing.

122. The device of claim 121 wherein said flexible housing is covered by a blanket disposed in a horizontal orientation.

123. The device of claim 93 wherein said solid material is moved by the force of gravity from said second storage means to said at least one outlet.

124. The device of claim 93 wherein said entraining means includes a chemical injector pump.

125. The device of claim 124 wherein said solid material is mixed with said liquid and stored in a third storage means before the resulting slurry is entrained by said chemical injector pump.

126. The device of claim 125 wherein said chemical injector pump injects said slurry into said liquid before said liquid has reached said valve means.

127. The device of claim 125 which further includes a flow meter disposed between said third storage means and said chemical injector pump.

128. The device of claim 124 wherein said entraining means further includes a check valve disposed downstream of said chemical injector pump.

129. The device of claim 114 wherein a flush line accepts a flush liquid and delivers said flush liquid to said entraining means, whereby said chemical injector pump, valve means, at least one outlet and entraining means can all be flushed with said flush liquid.

130. The device of claim 93 which further comprises a bypass means which communicates with said communication means whereby liquid can be returned to said first storage means when said valve means does not allow said liquid to pass to said at least one outlet.

131. The device of claim 93 wherein said porous media is earth.

132. The device of claim 131 wherein said earth is disposed in a field for crops.

133. The device of claim 131 wherein grass is growing on said earth.

134. The device of claim 133 wherein said earth with grass growing on it is part of a golf course.

* * * * *